United States Patent
Saraf et al.

(10) Patent No.: US 11,076,002 B1
(45) Date of Patent: Jul. 27, 2021

(54) APPLICATION STREAMING WITH SPECIALIZED SUBDOMAINS

(71) Applicant: Amazon Technologies, Inc., Seattle, WA (US)

(72) Inventors: Rahul Kishore Saraf, Seattle, WA (US); Joseph Jabril Hooper, Seattle, WA (US); Prasad Renake, Seattle, WA (US); Vinothkumar Narasimhan, Bellevue, WA (US); Murali Rathinasamy, Seattle, WA (US); Zishen Hu, Seattle, WA (US); Naveen Mahadevaiah, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/908,289

(22) Filed: Jun. 22, 2020

(51) Int. Cl.
*H04L 29/08* (2006.01)
*H04L 9/06* (2006.01)
*H04L 29/06* (2006.01)
*H04L 29/12* (2006.01)

(52) U.S. Cl.
CPC .......... *H04L 67/146* (2013.01); *H04L 9/06* (2013.01); *H04L 61/1511* (2013.01); *H04L 63/0407* (2013.01); *H04L 63/10* (2013.01); *H04L 67/02* (2013.01); *H04L 67/22* (2013.01)

(58) Field of Classification Search
None
See application file for complete search history.

(56) References Cited

U.S. PATENT DOCUMENTS

| | | | | |
|---|---|---|---|---|
| 7,308,504 B2* | 12/2007 | Satuloori | .............. | H04L 29/06 709/224 |
| 8,239,546 B1* | 8/2012 | McGowan | ........ | H04L 29/08639 709/227 |
| 8,898,272 B1* | 11/2014 | Young | ................. | H04L 63/0407 709/223 |
| 9,288,118 B1* | 3/2016 | Pattan | ...................... | H04L 63/08 |
| 9,344,505 B1* | 5/2016 | Martin | .................. | H04L 67/146 |
| 9,529,572 B1* | 12/2016 | Totale | ...................... | G06F 8/35 |
| 9,953,105 B1* | 4/2018 | Gupta | ..................... | H04L 67/02 |
| 10,243,957 B1* | 3/2019 | Wasiq | ................. | G06F 21/6263 |
| 10,333,936 B2* | 6/2019 | Kantorovskiy | ......... | H04L 63/10 |
| 10,747,787 B2* | 8/2020 | Reshadi | .................. | H04L 67/02 |
| 10,885,143 B2* | 1/2021 | Nguyen | ................ | H04L 63/083 |
| 2008/0027809 A1* | 1/2008 | Storm | ................. | G06Q 30/0239 705/14.16 |
| 2008/0270527 A1* | 10/2008 | Krabach | ................. | H04L 67/02 709/203 |

(Continued)

*Primary Examiner* — Lashonda T Jacobs
(74) *Attorney, Agent, or Firm* — BakerHostetler

(57) ABSTRACT

A first subdomain name may be generated based at least in part on first session parameters associated with a first streaming session. A first subdomain of a domain may be formed, wherein the first subdomain has the first subdomain name. A first authorization cookie for the first streaming session may be stored at the first subdomain. A second subdomain name may be generated based at least in part on the second session parameters associated with a second streaming session. A second subdomain of the same domain may be formed, wherein the second subdomain has the second subdomain name. A second authorization cookie for the second streaming session may be stored at the second subdomain.

20 Claims, 10 Drawing Sheets

(56) References Cited

U.S. PATENT DOCUMENTS

| | | | |
|---|---|---|---|
| 2010/0064234 A1* | 3/2010 | Schreiber | G06F 9/454 715/760 |
| 2011/0225206 A1* | 9/2011 | Sureshchandra | H04L 29/12066 707/802 |
| 2013/0086656 A1* | 4/2013 | Paddon | H04L 63/0815 726/6 |
| 2013/0332606 A1* | 12/2013 | Subramaniam | G06F 21/41 709/225 |
| 2014/0351405 A1* | 11/2014 | Brown | H04L 67/146 709/223 |
| 2015/0088978 A1* | 3/2015 | Motukuru | H04L 67/02 709/203 |
| 2017/0169100 A1* | 6/2017 | Reshadi | H04L 63/0414 |
| 2018/0212965 A1* | 7/2018 | Kantorovskiy | H04L 67/146 |
| 2018/0241748 A1* | 8/2018 | Mogaki | G06F 21/41 |

* cited by examiner

APPLICATION STREAMING WITH SPECIALIZED SUBDOMAINS

BACKGROUND

The popularity of application streaming has increased rapidly in recent years. Application streaming services may allow users on any computer to access and interact with applications that are hosted and executed at remote servers, for example via a browser on a client computer. Image data of an application user interface may be streamed from a remote server to a client computer, while user input to the application may be transmitted from the client computer back to the remote server. In some examples, to allow authentication of an application streaming session, an authentication uniform resource locator (URL) for the streaming session may be received. The authentication URL may include encoded session parameters associated with the user session, user credentials (e.g., user identifier (ID), account ID, etc.), a resource name (e.g., stack name) and other parameters. Additionally, in some examples, to allow authorization of an application streaming session, an authorization cookie for the streaming session may be generated and stored in association with the application streaming session.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
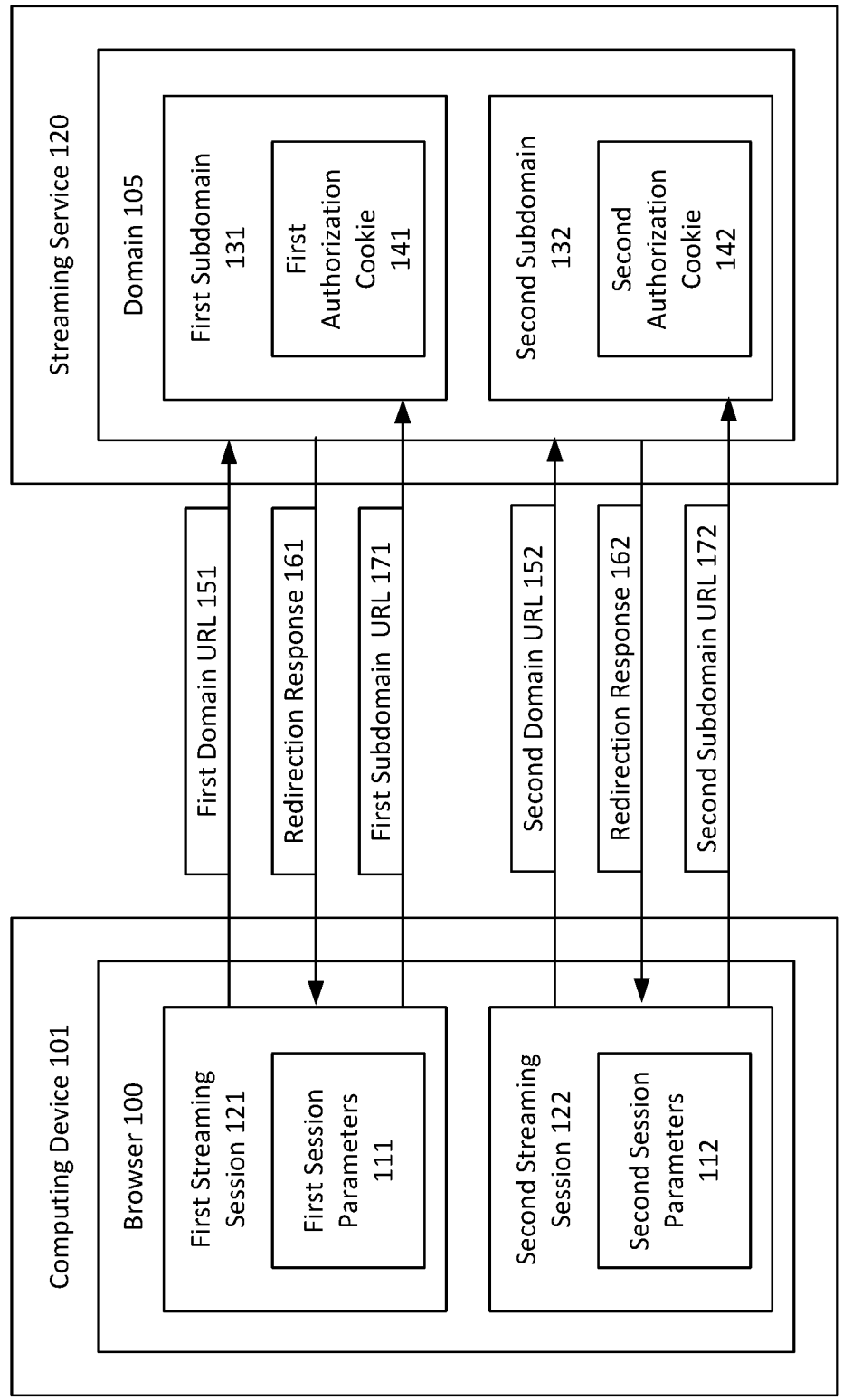
FIG. 1 is a diagram illustrating an example application streaming system with specialized subdomains that may be used in accordance with the present disclosure.

Techniques for application streaming with specialized subdomains are described herein. The techniques described herein may relate to authentication and authorization techniques for an application streaming session between a remote server and a local client device. For example, image data of an application user interface may be streamed from the remote server to the local client device, while user input to the application may be transmitted from the local client device computer back to the remote server. As described above, in some examples, to allow authentication of an application streaming session, an authentication uniform resource locator (URL) for the streaming session may be received. The authentication URL may include encoded session parameters associated with the streaming session, such as user credentials (e.g., user identifier (ID), account ID, etc.), a resource name (e.g., stack name) and other parameters. Additionally, in some examples, to allow authorization of an application streaming session, an authorization cookie for the streaming session may be generated and stored in association with the application streaming session.

In some conventional techniques, the authentication URL for a streaming session may be directed to a domain of the streaming service, and the authorization cookie for the streaming session may be stored at the level of the domain to which the authentication URL is directed. For example, an authentication URL for a streaming session may be directed to a domain (e.g., domain.example), and the authorization cookie for the streaming session may be stored at the level of the domain to which the authentication URL is directed (e.g., the domain.example level). However, this approach may be problematic for a number of reasons. For example, in one scenario, multiple streaming sessions may sometimes be established concurrently (or at least partially concurrently) within the same browser on the same device. This may occur, for example, when streaming sessions are established in multiple windows and/or tabs of the same browser—or when one or more streaming sessions are embedded into another streaming session (e.g., via inline frames, etc.). In one specific example, a first streaming session may be established, and, while the first streaming session is still executing, a second streaming session may then be established within the same browser as the first streaming session. The first streaming session may have a respective first authorization cookie, and the second streaming session may have a respective second authorization cookie. However, when both the first and the second authorization cookies are stored at the same domain level, the creation of the second authorization cookie may overwrite the first authorization cookie. This may result in several problems. For example, once the first authorization cookie is overwritten, subsequent authentication calls (e.g., for connecting storage, expiring the session, etc.) may not be authorized and may fail. As another example, if the first streaming session is refreshed (e.g., via a browser refresh button, etc.), the data from the first streaming session may be replaced with data from the second streaming session.

In order to alleviate these and other problems, the techniques described herein may generate and employ specialized subdomains for storage of authorization cookies. Specifically, in some examples, when a first authentication URL (also referred to herein as a first domain URL) for a first streaming session is received by a service, the service may obtain first session parameters for the first streaming session. As described above, in some examples, the first session parameters may include user credentials (e.g., user ID, account ID, etc.), a resource name (e.g., stack name) and other parameters. As also described above, the first session parameters may be encoded into the first authentication URL for the first streaming session. Thus, in some examples, first session parameters may be obtained by decoding a respective portion of the first authentication URL. The service may then generate a first subdomain name based at least in part on the first session parameters. For example, in some cases, the first subdomain name may be generated by applying a cryptographic function, such as a hash function, to the first session parameters. The cryptographic function that is used may be selected based at least in part on a size of its output. For example, it may be advantageous to employ a cryptographic function that returns an output whose size is less than or equal to a maximum length of a level within a domain name, which is sixty-three characters. In one specific example, a SHA-224 hash function, which returns an output having a length of fifty-six characters, may be employed. The SHA-224 hash function may be advantageous because it may offer a high level of cryptographic security while also returning an output of less than sixty-three characters. By contrast, some other hash functions may return outputs having more than sixty-three characters and may therefore not be advantageous for use in generating a subdomain name. In some examples, once the first subdomain name (e.g., abcdef.domain.example) is generated, a first subdomain having the first subdomain name may then be formed. The first user session may then be automatically redirected from the domain (e.g., domain.example) to the first subdomain (e.g., abcdef.domain.example). A first authorization cookie for the first streaming session may then be generated and stored at the first subdomain (e.g., abcdef.domain.example).

When a second authentication URL (also referred to herein as a second domain URL) for a second streaming session is received by the service, the service may obtain second session parameters for the second streaming session. The service may then generate a second subdomain name based at least in part on the second session parameters. For example, in some cases, the second subdomain name may be generated by applying the same cryptographic function to the second session parameters. In some examples, once the second subdomain name (e.g., uvwxyz.domain.example) is generated, a second subdomain having the second subdomain name may then be formed. The second user session may then be automatically redirected from the domain (e.g., domain.example) to the second subdomain (e.g., uvwxyz.domain.example). A second authorization cookie for the second streaming session may then be generated and stored at the second subdomain (e.g., uvwxyz.domain.example). Thus, by storing the first and second authorization cookies at the subdomain level instead of the domain level, the first and second authorization cookies may be stored at different respective subdomains. This may allow the second authorization cookie to be created and stored without overwriting the first authorization cookie—even when the first and second sessions are executed concurrently (or partially concurrently) in the same browser application on the same computing device.

In addition to the advantages described above, the ability to generate a subdomain name as a function of session parameters may also provide a number of other advantages. Specifically, in some cases, when a subdomain name is generated based on session parameters, the same subdomain name may be regenerated any number of times using the same session parameters. For example, if a subdomain name is generated by applying a hash function to session parameters, then the same subdomain name may be regenerated any number of times by reapplying the same hash function to the same session parameters. This may allow a streaming session to be returned to a same subdomain to which it was previously assigned, for example when the streaming session returns from an interaction with another site external to the streaming service (e.g., for storage) or when re-establishing the streaming session after a disconnection.

FIG. 1 is a diagram illustrating an example application streaming system with specialized subdomains that may be used in accordance with the present disclosure. As shown in FIG. 1, a first streaming session 121 and a second streaming session 122 are established and presented via a browser 100 executing on a computing device 101. The first streaming session 121 and the second streaming session 122 present data transmitted from streaming service 120. For example, the first streaming session 121 and the second streaming session 122 may include image (e.g., video) data of an application user interface that may be streamed from the streaming service 120 to the computing device 101, while user input to the application may be transmitted from the computing device 101 back to the streaming service 120. The first streaming session 121 and the second streaming session 122 may be established over one or more networks, for example one or more local area networks (LAN's) and/or one or more wide area networks (WAN's), such as the Internet. Additionally, for streaming sessions such as first streaming session 121 and second streaming session 122, image data may be transmitted from streaming service 120 to browser 100 using streaming transmission techniques, in which portions of transmitted content are received and presented while subsequent portions of the transmitted content are being transmitted. It is noted that FIGS. 1-7 and the examples below relate to streaming sessions, such as first streaming session 121 and second streaming session 122. However, it is noted that the techniques described herein are not limited to streaming sessions in which data is transmitted using streaming transmission techniques. The techniques described herein may also be employed for other communication sessions in which data is transmitted using non-streaming techniques. For example, the techniques described herein may be employed in application sessions in which data may be transmitted using streaming and/or non-streaming techniques. Application sessions, as used herein, are communication sessions in which data associated with an application is transmitted and received using streaming and/or non-streaming techniques. Additionally, while FIGS. 1-7 and the examples below relate to a streaming service, such as streaming service 120, the techniques described herein may also be employed in connection with other services that do not necessarily employ streaming transmission techniques.

In the example of FIG. 1, first streaming session 121 and second streaming session 122 are executed in the same browser 100. For example, first streaming session 121 and second streaming session 122 may execute in different windows and/or different tabs of browser 100. As another example, second streaming session 122 may be embedded into first streaming session 121 (or vice versa), for example using an inline frame. As described in detail below, the techniques described herein may offer a number of advantages for streaming sessions that are executed within the same browser, such as the ability to execute concurrently without overwriting of authorization cookies. It is noted, however, that the techniques described herein are not limited to scenarios in which multiple streaming sessions execute in the same browser—and may also be employed in scenarios in which multiple streaming sessions execute in different browsers. Additionally, in the example of FIG. 1, first streaming session 121 and second streaming session 122 may execute at least partially concurrently with one another. For example, first streaming session 121 and second streaming session 122 may be initiated simultaneously. In another example, first streaming session 121 may be initiated first, and then second streaming session 122 may be initiated at a later time while first streaming session 121 is still occurring. It is noted, however, that while the techniques described herein provide advantages for at least partially concurrent streaming sessions, these techniques may also be employed to streaming sessions that do not overlap one another.

As described in detail below, to allow authentication of the first streaming session 121, a first domain URL 151, which is an authentication URL, may be sent from browser 100 to streaming service 120. The first domain URL 151 may be directed to domain 105 of streaming service 120. The first domain URL 151 may include first session parameters 111 associated with the first streaming session 121, such as user credentials (e.g., user identifier (ID), account ID, etc.), a resource name (e.g., stack name) and other parameters. Upon receiving the first domain URL 151, the streaming service 120 may generate a first subdomain name as a function of the first session parameters 111. The streaming service 120 may then generate a first subdomain 131 that has the first subdomain name. The streaming service 120 may issue a redirection response 161 to redirect the first streaming session 121 to the first subdomain 131. A first subdomain URL 171 directed to the first subdomain 131 may then be sent from the browser 100 to the streaming service 120. The streaming service 120 may verify that the first subdomain URL 171 is directed to the first subdomain 131 and may authenticate the first streaming session 121 based on the first session parameters 111. A respective first authorization cookie 141 for the first streaming session 121 may be stored at the first subdomain 131. As used herein, the term domain URL refers to a URL directed to a domain, while the term subdomain URL refers to a URL directed to a subdomain of the domain to which the domain URL is directed.

Similarly, to allow authentication of the second streaming session 122, a second domain URL 152, which is an authentication URL, may be sent from browser 100 to streaming service 120. The second domain URL 152 may be directed to domain 105 of streaming service 120. The second domain URL 152 may include second session parameters 112 associated with the second streaming session 122, such as user credentials (e.g., user identifier (ID), account ID, etc.), a resource name (e.g., stack name) and other parameters. Upon receiving the second domain URL 152, the streaming service 120 may generate a second subdomain name as a function of the second session parameters 112. The streaming service 120 may then generate a second subdomain 132 that has the second subdomain name. The streaming service 120 may issue a redirection response 162 to redirect the second streaming session 122 to the second subdomain 132. A second subdomain URL 172 directed to the second subdomain 132 may then be sent from the browser 100 to the streaming service 120. The streaming service 120 may verify that the second subdomain URL 172 is directed to the second subdomain 132 and may authenticate the second streaming session 122 based on the second session parameters 112. A respective second authorization cookie 142 for the second streaming session 122 may be stored at the second subdomain 132.

Figure 2:
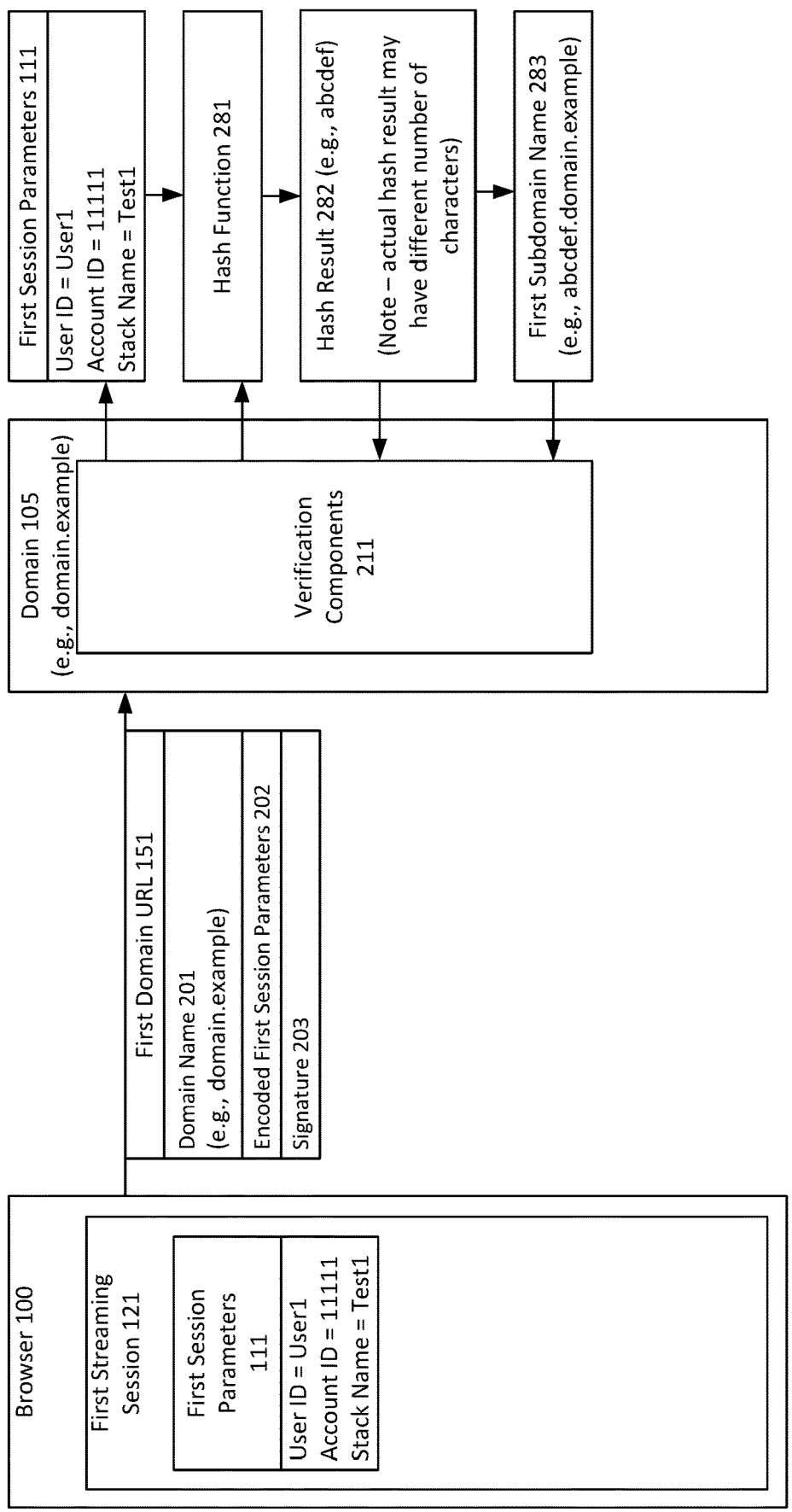
FIG. 2 is a diagram illustrating an example domain uniform resource locator (URL) for a first streaming session that may be used in accordance with the present disclosure.

Referring now to FIG. 2, an example processing of first domain URL 151 will now be described in detail. Specifically, as shown in FIG. 2, first domain URL 151 may be submitted by browser 100 to domain 105 of streaming service 120 for authentication of first streaming session 121. In the example of FIG. 2, the first domain URL 151 includes a domain name 201, encoded first session parameters 202, and a signature 203. The domain name 201 is a name (e.g., domain.example) of the domain 105 to which the first domain URL 151 is directed. Encoded first session parameters 202 include one or more of the first session parameters 111 in an encoded form. Signature 203 is used to sign the first domain URL 151, such as to cause the first domain URL 151 to become invalid in the event that someone tries to tamper with the encoded first session parameters 202. At least one of the first session parameters 111 may be unique to the first streaming session 121. In the example of FIG. 2, the first session parameters 111 include a user ID (User1), an account ID (11111), and a stack name (Test1), and each of these three parameters is encoded into the encoded first session parameters 202. The first session parameters 111 may also include other parameters, such as an expiration time/date, an application ID, a user context, a maximum duration, and/or other parameters. In some examples, the first domain URL 151 may be generated, based on the first session parameters 111, by streaming service 120, such as by a console or client application of streaming service 120.

In the example of FIG. 2, the first domain URL 151 is received by verification components 211 of the streaming service 120. Upon receipt of the first domain URL 151, the verification components 211 may decode the encoded first session parameters 202 back into the first session parameters 111. The authentication components may then apply a hash function 281 to one or more of the first session parameters 111 to generate a hash result 282 (e.g., abcdef). The hash result 282 is then used to form a first subdomain name 283 (e.g., abcdef domain.example). In some examples, instead of hash function 281, another type of cryptographic function may be employed to the first session parameters 111 to generate the first subdomain name 283. In the example of FIG. 2, the example hash result (abcdef) has a length of six characters. However, the length of six characters is merely used for ease of illustration, and the hash result 282 may have a different length. The type of hash function (or other cryptographic function) that is used may be selected based at least in part on a size of its output. For example, it may be advantageous to employ a hash function (or other cryptographic function) that returns an output whose size is less than or equal to a maximum length of a level within a domain name, which is sixty-three characters. In one specific example, hash function 281 may be a SHA-224 hash function, which returns an output having a length of fifty-six characters. The SHA-224 hash function may be advantageous because it may offer a high level of cryptographic security while also returning an output of less than sixty-three characters.

Figure 3:
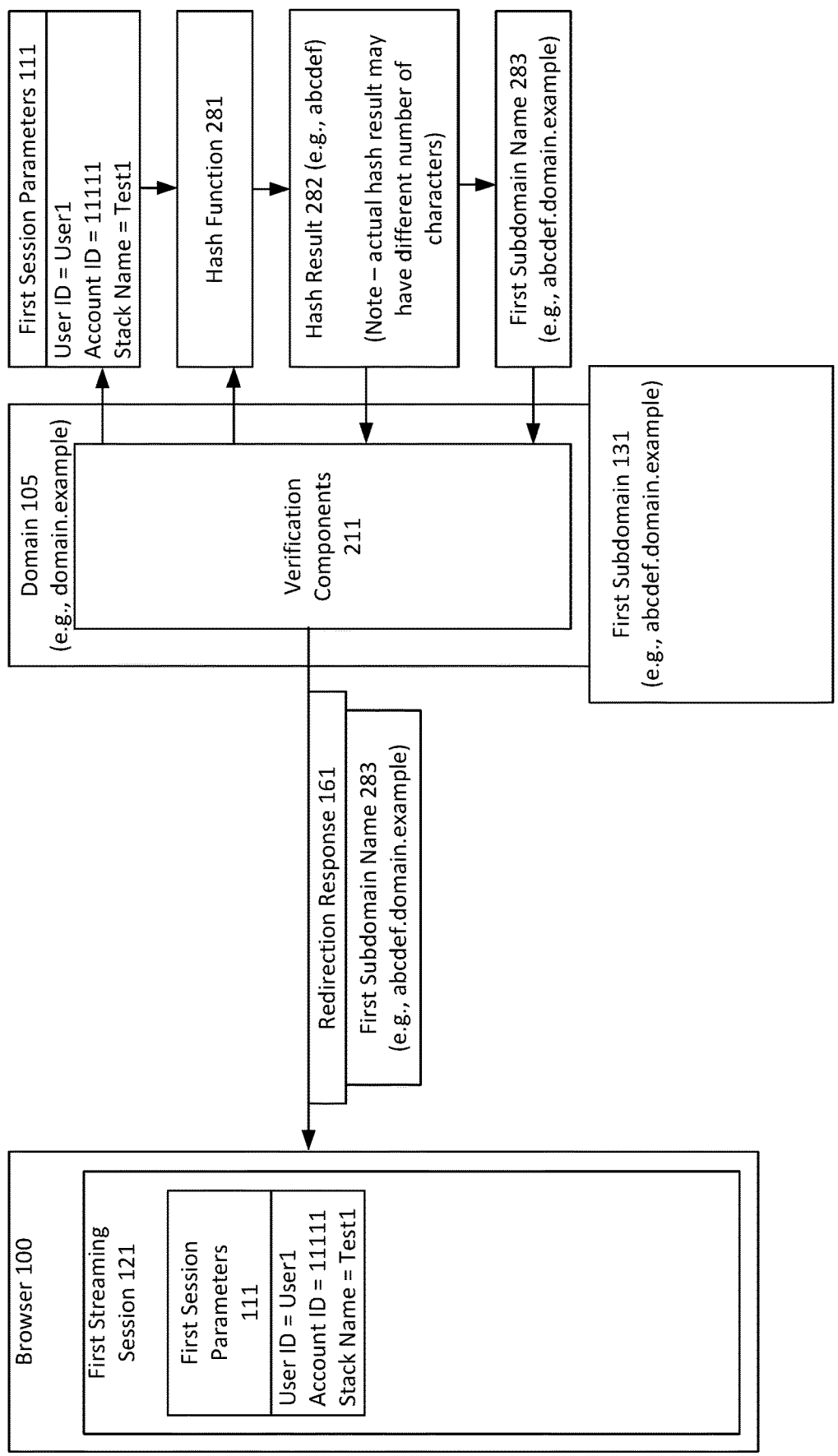
FIG. 3 is a diagram illustrating an example redirection response for a first streaming session that may be used in accordance with the present disclosure.

In some examples, once the first subdomain name 283 (e.g., abcdef domain.example) is generated, a first subdomain having the first subdomain name may then be formed. Referring now to FIG. 3, it is seen that first subdomain 131 of domain 105 is formed, and the first subdomain 131 has the first subdomain name 283 (e.g., abcdef domain.example). As also shown in FIG. 3, the verification components 211 may issue a redirection response 161 to the browser 100 in order to redirect the first streaming session 121 to the first subdomain 131. The redirection response 161 may include the first subdomain name 283 (e.g., abcdef.domain.example). The redirection response 161 may be a standard hypertext transfer protocol (HTTP) redirection response, such as an HTTP code 302 response.

Figure 4:
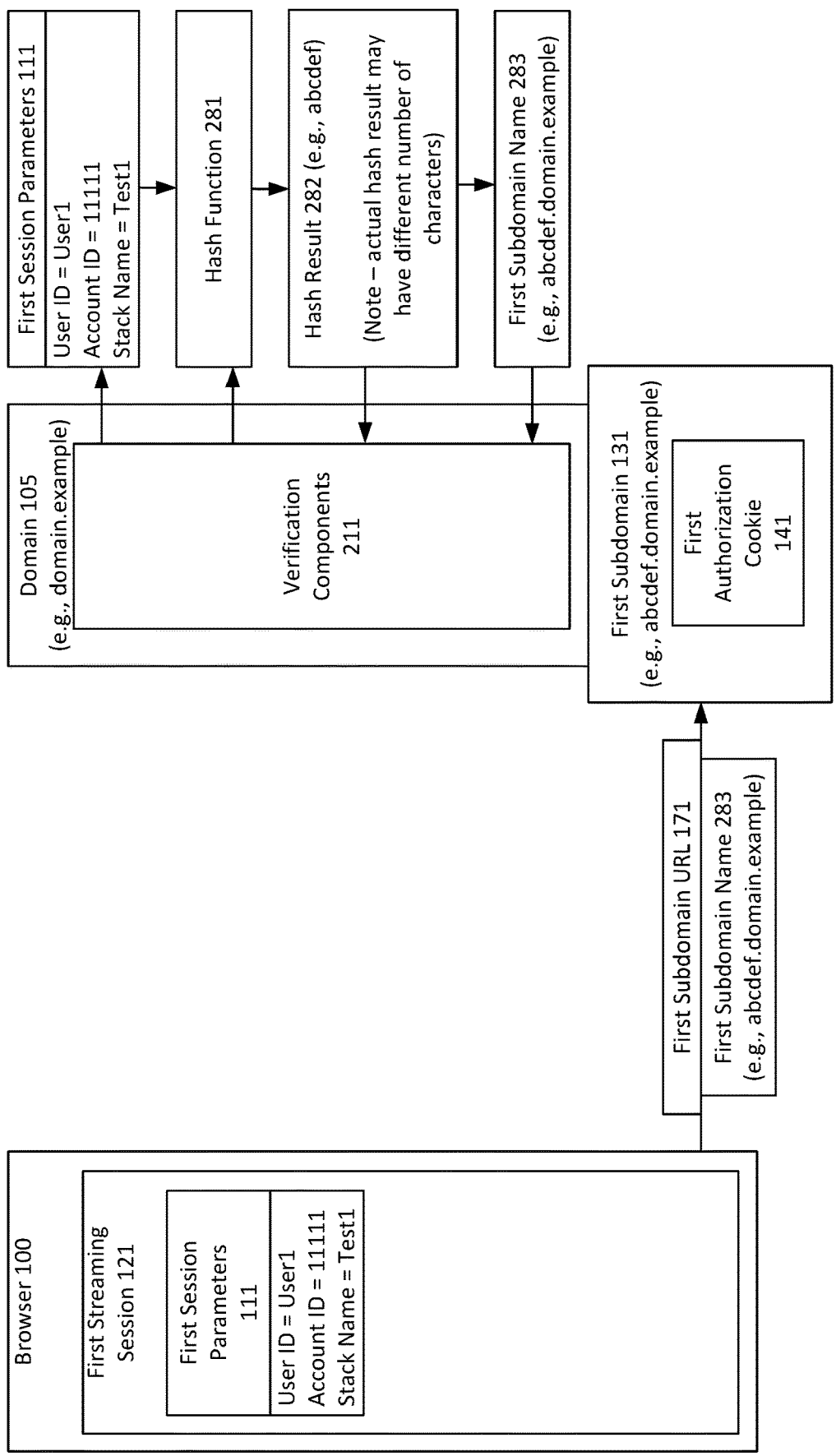
FIG. 4 is a diagram illustrating an example first subdomain and first authorization cookie for a first streaming session that may be used in accordance with the present disclosure.

Upon receipt of the redirection response 161, the browser may load a first subdomain URL 171 that includes the first subdomain name 283 (e.g., abcdef.domain.example). Referring now to FIG. 4, it is seen that the first subdomain URL 171 directed to the first subdomain 131 and including the first subdomain name 283 (e.g., abcdef.domain.example) may be sent from the browser 100 to the streaming service 120. The streaming service 120 may verify that the first subdomain URL 171 is directed to the first subdomain 131. The streaming service 120 may also authenticate the first streaming session 121 based on the first session parameters 111. As also shown in FIG. 4, a first authorization cookie 141 for the first streaming session 121 may then be generated and stored at the first subdomain 131 (e.g., abcdef.domain.example).

Figure 5:
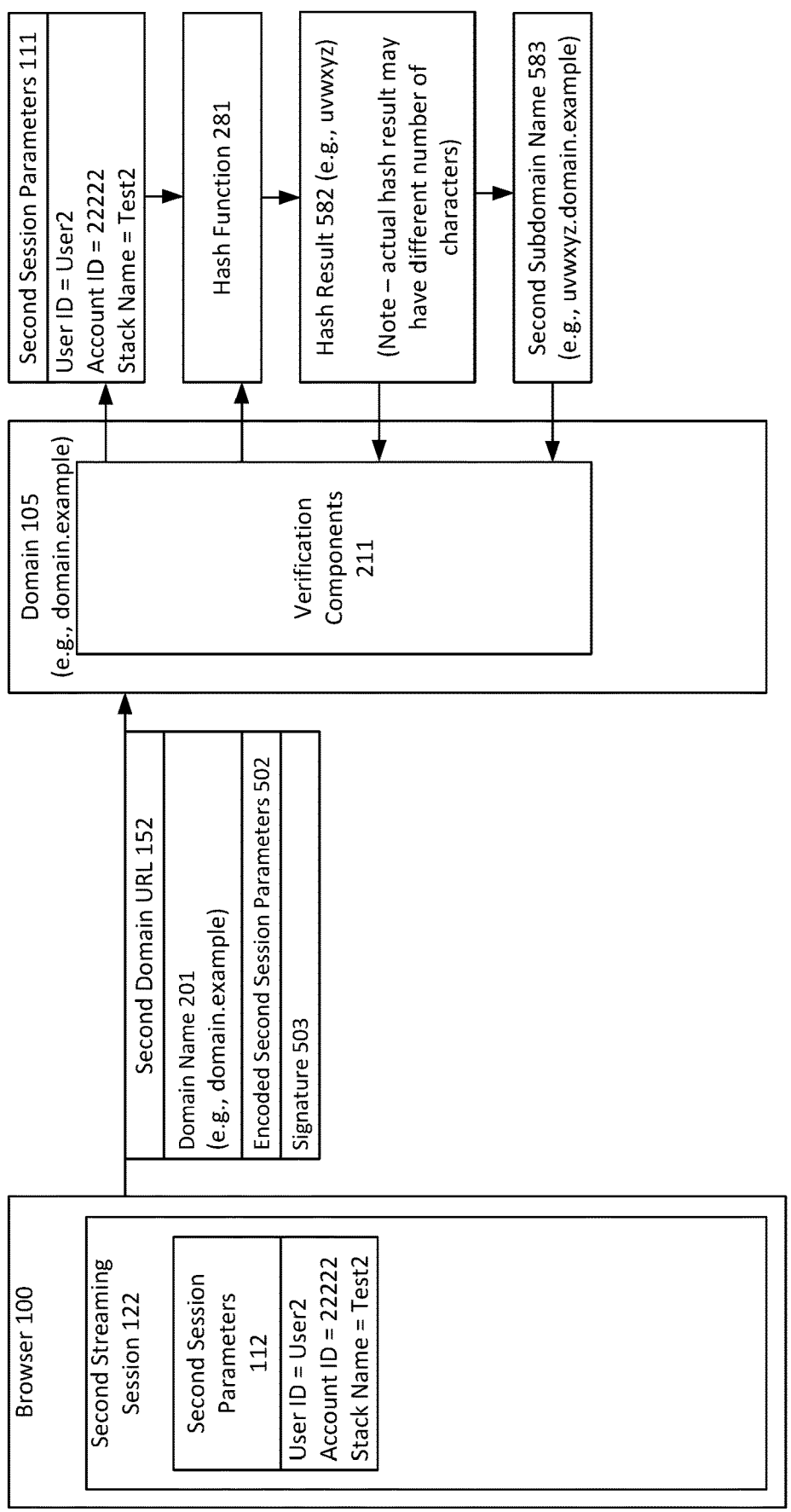
FIG. 5 is a diagram illustrating an example domain uniform resource locator (URL) for a second streaming session that may be used in accordance with the present disclosure.

Referring now to FIG. 5, an example processing of second domain URL 152 will now be described in detail. Specifically, as shown in FIG. 5, second domain URL 152 may be submitted by browser 100 to domain 105 of streaming service 120 for authentication of second streaming session 122. As described above, first streaming session 121 and second streaming session 122 may execute in different windows and/or different tabs of browser 100. As another example, second streaming session 122 may be embedded into first streaming session 121 (or vice versa), for example using an inline frame. In the example of FIG. 5, the second domain URL 152 includes a domain name 201, encoded second session parameters 502, and a signature 503. The domain name 201 is a name (e.g., domain.example) of the domain 105 to which the second domain URL 152 is directed. Encoded second session parameters 502 include one or more of the second session parameters 112 in an encoded form. Signature 503 is used to sign the second domain URL 152, such as to cause the second domain URL 152 to become invalid in the event that someone tries to tamper with the encoded second session parameters 502. At least one of the second session parameters 112 may be unique to the second streaming session 122. In the example of FIG. 5, the second session parameters 112 include a user ID (User2), an account ID (22222), and a stack name (Test2), and each of these three parameters is encoded into the encoded second session parameters 502. The second session parameters 112 may also include other parameters, such as an expiration time/date, an application ID, a user context, a maximum duration, and/or other parameters. In some examples, the second domain URL 152 may be generated, based on the second session parameters 112, by streaming service 120, such as by a console or client application of streaming service 120.

In the example of FIG. 5, the second domain URL 152 is received by verification components 211 of the streaming service 120. Upon receipt of the second domain URL 152, the verification components 211 may decode the encoded second session parameters 502 back into the second session parameters 112. The authentication components may then apply hash function 281 (or another cryptographic function) to one or more of the second session parameters 112 to generate a hash result 582 (e.g., uvwxyz). The hash result 582 is then used to form a second subdomain name 583 (e.g., uvwxyz.domain.example).

Figure 6:
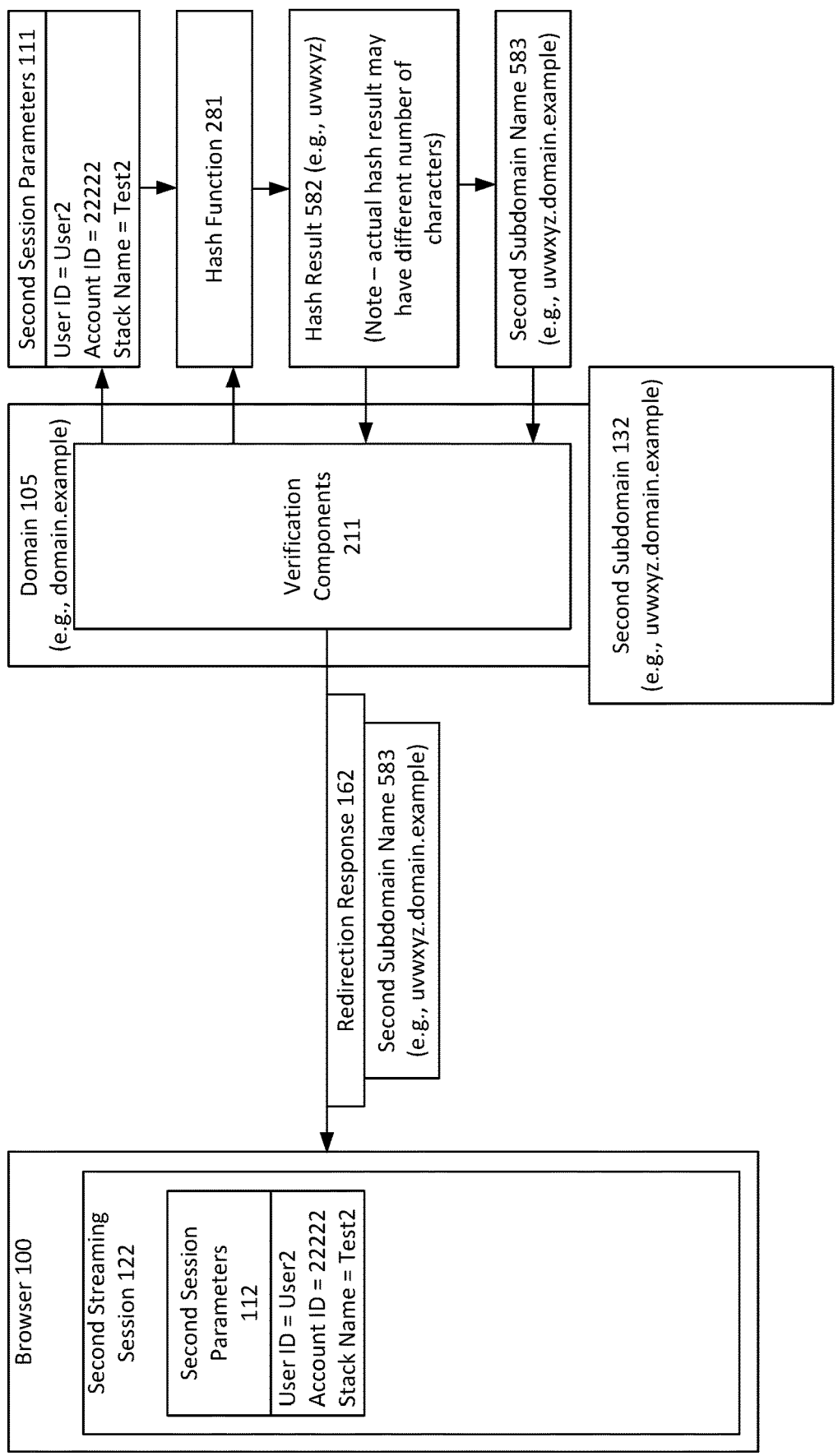
FIG. 6 is a diagram illustrating an example redirection response for a second streaming session that may be used in accordance with the present disclosure.

In some examples, once the second subdomain name 583 (e.g., uvwxyz.domain.example) is generated, a second subdomain having the second subdomain name may then be formed. Referring now to FIG. 6, it is seen that second subdomain 132 of domain 105 is formed, and the second subdomain 132 has the second subdomain name 583 (e.g., uvwxyz.domain.example). As also shown in FIG. 6, the verification components 211 may issue a redirection response 162 to the browser 100 in order to redirect the second streaming session 122 to the second subdomain 132. The redirection response 162 may include the second subdomain name 583 (e.g., uvwxyz.domain.example). The redirection response 162 may be a standard hypertext transfer protocol (HTTP) redirection response, such as an HTTP code three-zero-two response.

Figure 7:
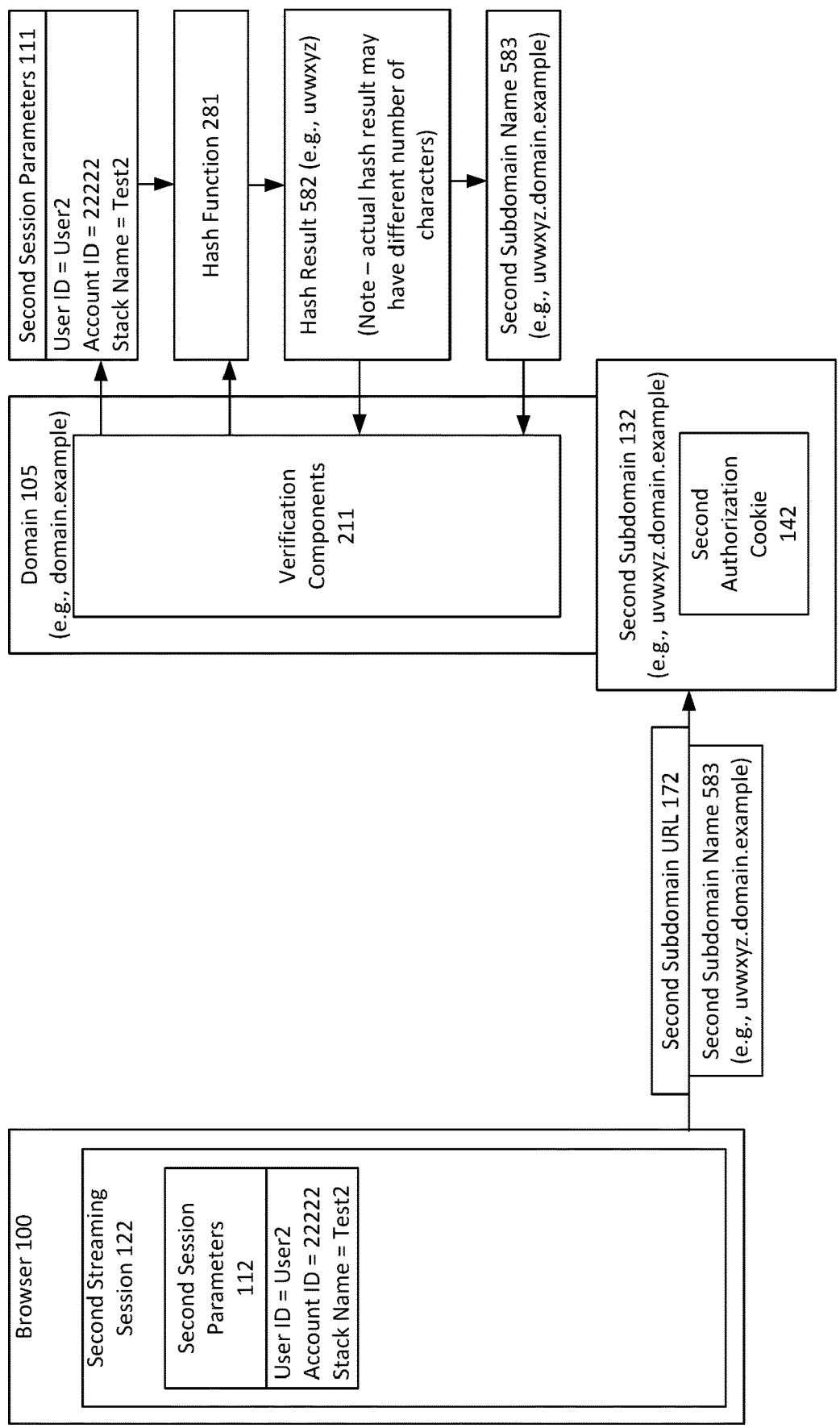
FIG. 7 is a diagram illustrating an example second subdomain and second authorization cookie for a second streaming session that may be used in accordance with the present disclosure.

Upon receipt of the redirection response 162, the browser may load a second subdomain URL 172 that includes the second subdomain name 583 (e.g., uvwxyz.domain.example). Referring now to FIG. 7, it is seen that the second subdomain URL 172 directed to the second subdomain 132 and including the second subdomain name 583 (e.g., uvwxyz.domain.example) may be sent from the browser 100 to the streaming service 120. The streaming service 120 may verify that the second subdomain URL 172 is directed to the second subdomain 132. The streaming service 120 may also authenticate the second streaming session 122 based on the second session parameters 112. As also shown in FIG. 7, a second authorization cookie 142 for the second streaming session 122 may then be generated and stored at the second subdomain 132 (e.g., uvwxyz.domain.example).

Thus, as shown above in FIGS. 1-7, a first subdomain 131 (e.g., abcdef.domian.example) is generated for a first streaming session 121, while a second subdomain 132 (e.g., uvwxyz.domian.example) is generated for a second streaming session 122. Additionally, a first authorization cookie 141 for the first streaming session 121 is stored at the first subdomain 131, while a second authorization cookie 142 for the second streaming session 122 is stored at the second subdomain 132. As described above, this is in contrast to conventional techniques in which multiple authorization cookies are stored at the domain level (e.g., domain.example) of a domain to which authentication URL's are directed. By storing the first and second authorization cookies 141 and 142 at different respective subdomains, the techniques described herein may allow the second authorization cookie 142 to be created and stored without overwriting the first authorization cookie 141 (or vice versa)—even though the first and second streaming sessions 121 and 122 may be executed concurrently (or partially concurrently) in the same browser application (i.e., browser 100) on the same computing device (i.e., computing device 101).

As also shown above in FIGS. 1-7, the first and second subdomain names 283 and 583 are generated by applying hash function 281 to first session parameters 111 and second session parameters 112, respectively. This allows the first and second subdomain names 283 and 583 to be regenerated any number of times. Specifically, the first subdomain name 283 and 583 may be regenerated any number of times by applying the hash function 281 to the first session parameters 111, while the second subdomain name 583 may be regenerated any number of times by applying the hash function 281 to the second session parameters 112. This may allow a streaming session to be returned to a same subdomain to which it was previously assigned, for example when the streaming session returns from an interaction with another site (e.g., for storage) or when re-establishing the streaming session after a disconnection.

It is noted that the above examples of FIGS. 1-7 relate to scenarios in which the first and the second streaming sessions are authenticated using authentication URL's (e.g. first domain URL 151 and second domain URL 152, respectively). It is noted, however, that the subdomain-based techniques described herein are not limited to URL-based authentication techniques and may also be employed in other types of authentication schemes, such as security assertion markup language (SAML) techniques, via user directories (e.g., user pools) of an identity and authentication service, and others. Thus, the techniques described herein may be used, for example, in any scenario in which multiple different subdomains of a common domain are generated, respectively, for multiple different streaming sessions, and in which an authorization cookie a respective one of the streaming sessions is stored at the respective subdomain.

Figure 8:
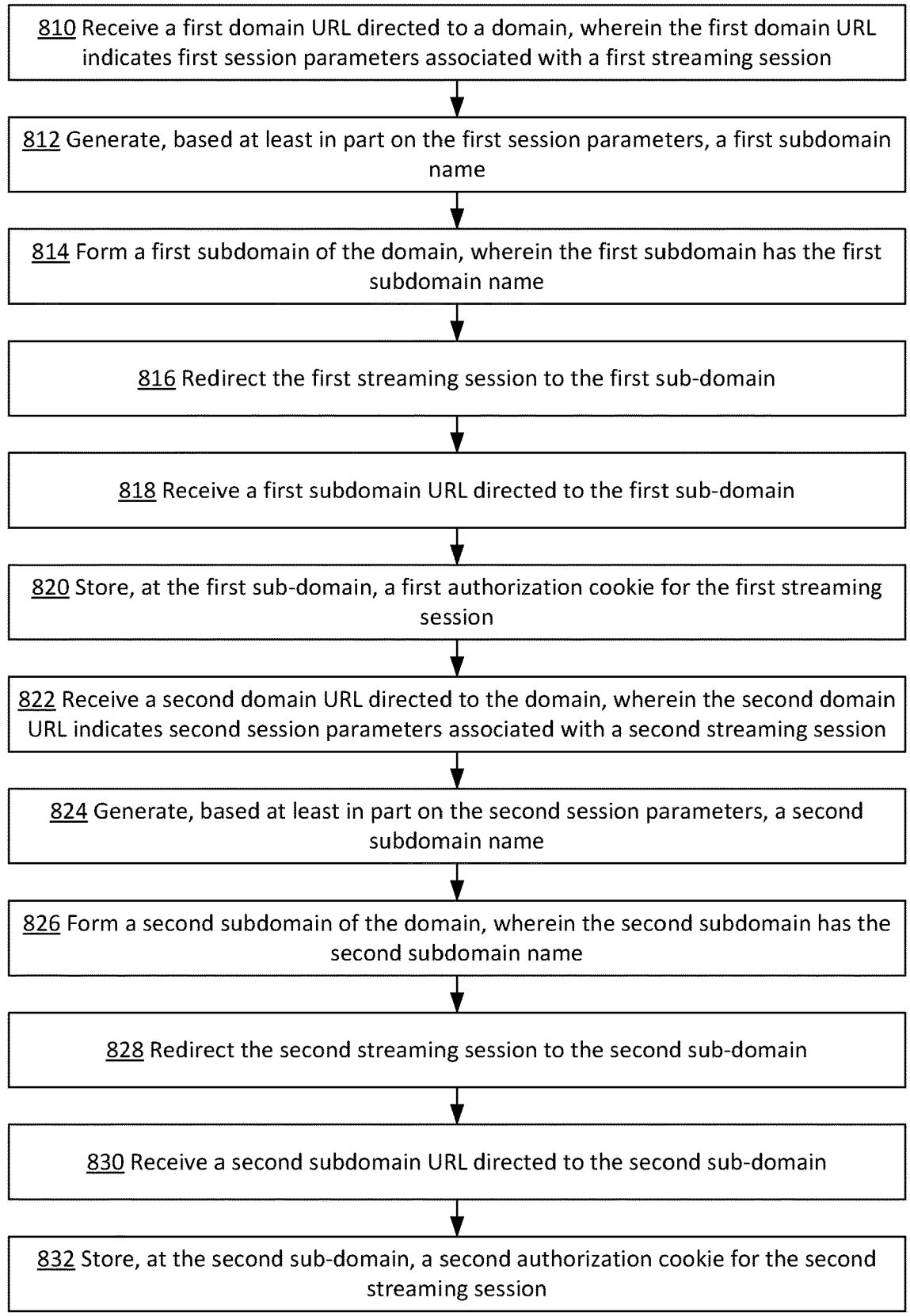
FIG. 8 is a flowchart illustrating an example process for application streaming with specialized subdomains that may be used in accordance with the present disclosure.

FIG. 8 is a flowchart illustrating an example process for application streaming with specialized subdomains that may be used in accordance with the present disclosure. The process of FIG. 8 is initiated at operation 810, at which a first domain URL directed to a domain is received. The first domain URL indicates first session parameters associated with a first streaming session. The first domain URL is for authentication of the first streaming session. For example, as shown in FIG. 2, first domain URL 151 is received by domain 105 of streaming service 120. First domain URL 151 includes domain name 201 (e.g., domain.example), which is a name of the domain 105 to which the first domain URL 151 is directed. Additionally, the first domain URL 151 indicates first session parameters 111 associated with the first streaming session 121 by including the first session parameters in an encoded form. In particular, first domain URL 151 includes encoded first session parameters 202, which include one or more of the first session parameters 111 in an encoded form. At least one of the first session parameters may be unique to the first streaming session. Signature 203 is used to sign the first domain URL 151, such as to cause the first domain URL 151 to become invalid in the event that someone tries to tamper with the encoded first session parameters 202. In the example of FIG. 2, the first session parameters 111 include a user ID (User1), an account ID (11111), and a stack name (Test1), and each of these three parameters is encoded into the encoded first session parameters 202. The first session parameters 111 may also include other parameters, such as an expiration time/date, an application ID, a user context, a maximum duration, and/or other parameters.

At operation 812, a first subdomain name is generated, based at least in part, on the first session parameters. Specifically, the first subdomain name may be generated by applying a hash function (or another cryptographic function) to data including the first session parameters. For example, referring back to FIG. 2, the first domain URL 151 is received by verification components 211 of the streaming service 120. Upon receipt of the first domain URL 151, the verification components 211 may decode the encoded first session parameters 202 back into the first session parameters 111. The authentication components may then apply a hash function 281 to the first session parameters 111 to generate a hash result 282 (e.g., abcdef). The hash result 282 is then used to form a first subdomain name 283 (e.g., abcdef.domain.example). In one specific example, hash function 281 may be a SHA-224 hash function, which returns an output having a length of fifty-six characters. The SHA-224 hash function may be advantageous because it may offer a high level of cryptographic security while also returning an output of less than sixty-three characters. In some examples, the hash function may be applied to only some (and not all) of the first session parameters included in the first domain URL.

At operation 814, a first subdomain of the domain is formed. The first subdomain has the first subdomain name. For example, as shown in FIG. 3, a first subdomain 131 is formed having the first subdomain name 283 (e.g., abcdef domain.example). In some examples, the streaming service 120 may modify its infrastructure to ensure that wildcard subdomains are supported. A wildcard subdomain, as that term is used herein, is a subdomain that may be generated dynamically using any valid non-predetermined subdomain name, such as a subdomain name that did not exist prior to receipt of the first domain URL. For example, to support wildcard subdomains, the streaming service may ensure that wildcard subdomains redirect properly to the streaming service, such as by setting up wildcard domain name system (DNS) entries to forward to a designated streaming service front/location and ensuring that they are properly signed with secure sockets layer (SSL) certificates.

At operation 816, the first streaming session is redirected to the first subdomain. For example, as shown in FIG. 3, the verification components 211 may issue a redirection response 161 to the browser 100 in order to redirect the first streaming session 121 from the domain 105 (e.g., domain.example) to the first subdomain 131 (e.g., abcdef.domain.example). The redirection response 161 may include the first subdomain name 283 (e.g., abcdef.domain.example). The redirection response may be a standard HTTP redirection response, such as an HTTP code three-zero-two response.

At operation 818, a first subdomain URL directed to the first subdomain is received. The first subdomain URL is received in response to the redirection of the first streaming session to the first subdomain. For example, as shown in FIG. 4, a first subdomain URL 171 directed to the first subdomain 131 and including the first subdomain name 283 (e.g., abcdef domain.example) may be sent from the browser 100 to the streaming service 120. The streaming service 120 may verify that the first subdomain URL 171 is directed to the first subdomain 131. The streaming service 120 may also authenticate the first streaming session 121 based on the first session parameters 111. For example, to authenticate the first streaming session, the streaming service may verify that the first session parameters 111 are valid, such as by verifying that they match corresponding stored information, that they are not expired, and/or that they have not been tampered with.

At operation 820, a first authorization cookie for the first streaming session is stored at the first subdomain. For example, as also shown in FIG. 4, a first authorization cookie 141 for the first streaming session 121 may be generated and stored at the first subdomain 131 (e.g., abcdef domain.example). In some examples, the first authorization cookie 141 may be generated by the streaming service 120, and the first authorization cookie 141 may be sent from the streaming service 120 to the browser 100. The browser 100 may then store the first authorization cookie at the first subdomain 131 (e.g., abcdef.domain.example). As described above, the first subdomain name may be regenerated any number of times by reapplying the hash function to data including the first session parameters. The regenerating of the first subdomain name may assist, for example, in session re-establishment after a disconnection of the first streaming session or after an interaction with a site external to the streaming service that hosts the first streaming session (e.g., for storage, etc.).

At operation 822, a second domain URL is received. The second domain URL is directed to the same domain as the first domain URL received at operation 810. The second domain URL indicates second session parameters associated with a second streaming session. The second domain URL is for authentication of the second streaming session. For example, as shown in FIG. 5, second domain URL 152 is received by domain 105 of streaming service 120. Second domain URL 152 includes domain name 201 (e.g., domain.example), which is a name of the domain 105 to which the second domain URL 152 is directed. Additionally, the second domain URL 152 indicates second session parameters 112 associated with the second streaming session 122 by including the second session parameters in an encoded form. In particular, second domain URL 152 includes encoded second session parameters 502, which include one or more of the second session parameters 112 in an encoded form. At least one of the second session parameters may be unique to the second streaming session. Signature 203 is used to sign the second domain URL 152, such as to cause the second domain URL 152 to become invalid in the event that someone tries to tamper with the encoded second session parameters 502. In the example of FIG. 5, the second session parameters 112 include a user ID (User2), an account ID (22222), and a stack name (Test2), and each of these three parameters is encoded into the encoded second session parameters 502. The second session parameters 112 may also include other parameters, such as an expiration time/date, an application ID, a user context, a maximum duration, and/or other parameters.

At operation 824, a second subdomain name is generated, based at least in part, on the second session parameters. Specifically, the second subdomain name may be generated by applying a hash function (or another cryptographic function) to data including the second session parameters. Referring back to FIG. 5, the second domain URL 152 is received by verification components 211 of the streaming service 120. Upon receipt of the second domain URL 152, the verification components 211 may decode the encoded second session parameters 502 back into the second session parameters 112. The authentication components may then apply a hash function 281 to the second session parameters 112 to generate a hash result 282 (e.g., uvwxyz). The hash result 282 is then used to form a second subdomain name 583 (e.g., uvwxyz.domain.example). The same hash function (or another same cryptographic function) may be employed to generate both the first and the second subdomain names. In some examples, the hash function may be applied to only some (and not all) of the second session parameters included in the second domain URL.

At operation 826, a second subdomain of the domain is formed. The second subdomain has the second subdomain name. For example, as shown in FIG. 6, a second subdomain 132 is formed having the second subdomain name 583 (e.g., uvwxyz.domain.example). In some examples, the streaming service 120 may modify its infrastructure to ensure that wildcard subdomains are supported, for example as described above with reference to operation 814.

At operation 828, the second streaming session is redirected to the second subdomain. For example, as shown in FIG. 6, the verification components 211 may issue a redirection response 162 to the browser 100 in order to redirect the second streaming session 122 from the domain 105 (e.g., domain.example) to the second subdomain 132 (e.g., uvwxyz.domain.example). The redirection response 162 may include the second subdomain name 583 (e.g., uvwxyz.domain.example). The redirection response may be a standard HTTP redirection response, such as an HTTP code three-zero-two response.

At operation 830, a second subdomain URL directed to the second subdomain is received. The second subdomain URL is received in response to the redirection of the second streaming session to the second subdomain. For example, as shown in FIG. 7, a second subdomain URL 172 directed to the second subdomain 132 and including the second subdomain name 583 (e.g., uvwxyz.domain.example) may be sent from the browser 100 to the streaming service 120. The streaming service 120 may verify that the second subdomain URL 172 is directed to the second subdomain 132. The streaming service 120 may also authenticate the second streaming session 122 based on the second session parameters 112. For example, to authenticate the second streaming session, the streaming service may verify that the second session parameters 112 are valid, such as by verifying that they match corresponding stored information, that they are not expired, and/or that they have not been tampered with.

At operation 832, a second authorization cookie for the second streaming session is stored at the second subdomain. For example, as also shown in FIG. 7, a second authorization cookie 142 for the second streaming session 122 may be generated and stored at the second subdomain 132 (e.g., uvwxyz.domain.example). In some examples, the second authorization cookie 142 may be generated by the streaming service 120, and the second authorization cookie 142 may be sent from the streaming service 120 to the browser 100. The browser 100 may then store the second authorization cookie at the second subdomain 131 (e.g., abcdef.domain.example). As described above, the second subdomain name may be regenerated any number of times by reapplying the hash function to data including the second session parameters. The regenerating of the second subdomain name may assist, for example, in session re-establishment after a disconnection of the second streaming session or after an interaction with a site external to the streaming service that hosts the second streaming session (e.g., for storage, etc.).

As described above, in some examples, the first and the second streaming sessions may be executed at least partially concurrently (e.g., at least partially overlapping in time) with one another. For example, in some cases, the first streaming session may be initiated first, and the second streaming session may then be initiated at a later time during execution of the first streaming session. In this example, storage of the first authorization cookie and the second authorization cookie at separate subdomains (i.e., the first and the second subdomain, respectively) allows the second authorization cookie to be stored without overwriting the first authorization cookie.

Figure 9:
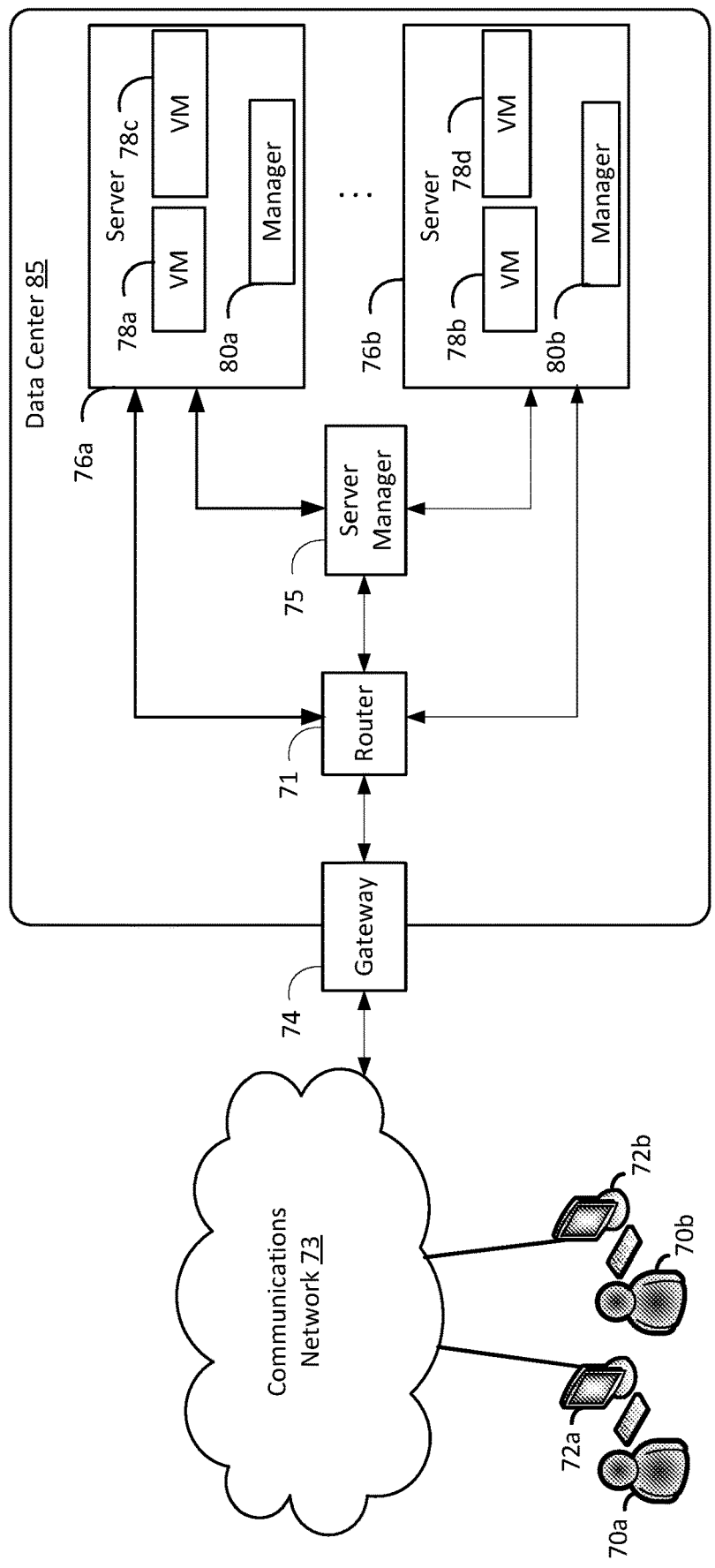
FIG. 9 is a diagram illustrating an example system for transmitting and providing data that may be used in accordance with the present disclosure.

An example system for transmitting and providing data will now be described in detail. In particular, FIG. 9 illustrates an example computing environment in which the embodiments described herein may be implemented. FIG. 9 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a-d* (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 9, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72*a* or 72*b* may be a server, a desktop or laptop personal computer, a tablet computer, a wireless telephone, a personal digital assistant (PDA), an e-book reader, a game console, a set-top box or any other computing device capable of accessing data center 85. User computer 72*a* or 72*b* may connect directly to the Internet (e.g., via a cable modem or a Digital Subscriber Line (DSL)). Although only two user computers 72*a* and 72*b* are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 9 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80*a* or 80*b* (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 9, a router 71 may be utilized to interconnect the servers 76*a* and 76*b*. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 9, a server manager 75 is also employed to at least in part direct various communications to, from and/or between servers 76a and 76b. While FIG. 9 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 9 has been greatly simplified and that many more networks and networking devices may be utilized to interconnect the various computing systems disclosed herein. These network topologies and devices should be apparent to those skilled in the art.

It should also be appreciated that data center 85 described in FIG. 9 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 10:
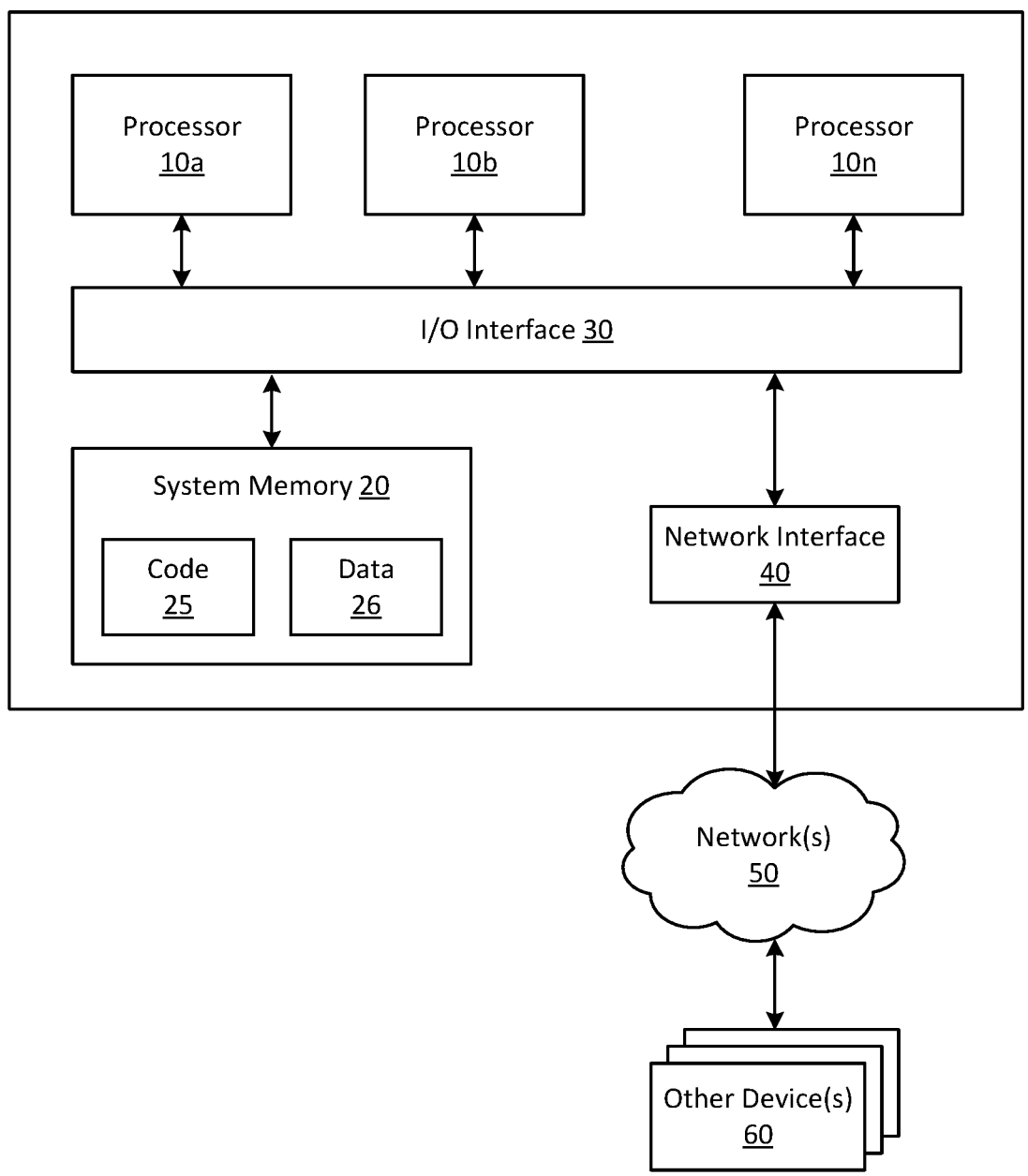
FIG. 10 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 10 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
   one or more processors; and
   one or more memories having stored therein computing instructions that, upon execution by the one or more processors, cause the computing system to perform operations comprising:
      receiving a first domain uniform resource locator (URL) directed to a domain, wherein the first domain URL indicates first session parameters associated with a first streaming session;
      generating, based at least in part on the first session parameters, a first subdomain name;
      forming a first subdomain of the domain, wherein the first subdomain has the first subdomain name;
      redirecting the first streaming session to the first subdomain;
      receiving a first subdomain URL directed to the first subdomain; and
      storing, at the first subdomain, a first authorization cookie for the first streaming session;
      receiving a second domain URL directed to the domain, wherein the second domain URL indicates second session parameters associated with a second streaming session executed on a same browser and a same computing device as the first streaming session;
      generating, based at least in part on the second session parameters, a second subdomain name;
      forming a second subdomain of the domain, wherein the second subdomain has the second subdomain name;
      redirecting the second streaming session to the second subdomain;
      receiving a second subdomain URL directed to the second subdomain; and
      storing, at the second subdomain, a second authorization cookie for the second streaming session.

2. The computing system of claim 1, wherein the first streaming session and the second streaming session are executed at least partially concurrently with one another.

3. The computing system of claim 1, wherein the second streaming session is initiated during execution of the first streaming session, and wherein storage of the first authorization cookie and the second authorization cookie at separate subdomains allows the second authorization cookie to be stored without overwriting the first authorization cookie.

4. The computing system of claim 1, wherein the first subdomain name is generated by applying a hash function to data including the first session parameters.

5. A computer-implemented method comprising:
receiving a first domain uniform resource locator (URL) directed to a domain, wherein the first domain URL indicates first session parameters associated with a first application session;
generating, based at least in part on the first session parameters, a first subdomain name;
forming a first subdomain of the domain, wherein the first subdomain has the first subdomain name;
redirecting the first application session to the first subdomain;
receiving a first subdomain URL directed to the first subdomain; and
generating a first authorization cookie for the first application session, wherein the first authorization cookie is stored at the first subdomain.

6. The computer-implemented method of claim 5, further comprising:
receiving a second domain URL directed to the domain, wherein the second domain URL indicates second session parameters associated with a second application session;
generating, based at least in part on the second session parameters, a second subdomain name;
forming a second subdomain of the domain, wherein the second subdomain has the second subdomain name;
redirecting the second application session to the second subdomain;
receiving a second subdomain URL directed to the second subdomain; and
generating a second authorization cookie for the second application session, wherein the second authorization cookie is stored at the second subdomain.

7. The computer-implemented method of claim 6, wherein the first application session and the second application session are executed at least partially concurrently with one another.

8. The computer-implemented method of claim 6, wherein the second application session is initiated during execution of the first application session, and wherein storage of the first authorization cookie and the second authorization cookie at separate subdomains allows the second authorization cookie to be stored without overwriting the first authorization cookie.

9. The computer-implemented method of claim 6, wherein the first application session and the second application session are executed in a same browser application on a same computing device.

10. The computer-implemented method of claim 5, wherein the first subdomain name is generated by applying a hash function to data including the first session parameters.

11. The computer-implemented method of claim 10, further comprising regenerating the first subdomain name by reapplying the hash function to the data including the first session parameters.

12. The computer-implemented method of claim 11, wherein the regenerating assists in session re-establishment after a disconnection of the first application session or after an interaction with a site external to a service that hosts the first application session.

13. One or more non-transitory computer-readable storage media having stored thereon computing instructions that, upon execution by one or computing devices, cause the one or more computing devices to perform operations comprising:
receiving a first domain uniform resource locator (URL) directed to a domain, wherein the first domain URL indicates first session parameters associated with a first application session;
generating, based at least in part on the first session parameters, a first subdomain name;
forming a first subdomain of the domain, wherein the first subdomain has the first subdomain name;
redirecting the first application session to the first subdomain;
receiving a first subdomain URL directed to the first subdomain; and
generating a first authorization cookie for the first application session, wherein the first authorization cookie is stored at the first subdomain.

14. The one or more non-transitory computer-readable storage media of claim 13, further comprising:
receiving a second domain URL directed to the domain, wherein the second domain URL indicates second session parameters associated with a second application session;
generating, based at least in part on the second session parameters, a second subdomain name;
forming a second subdomain of the domain, wherein the second subdomain has the second subdomain name;
redirecting the second application session to the second subdomain;
receiving a second subdomain URL directed to the second subdomain; and
generating a second authorization cookie for the second application session, wherein the second authorization cookie is stored at the second subdomain.

15. The one or more non-transitory computer-readable storage media of claim 14, wherein the first application session and the second application session are executed at least partially concurrently with one another.

16. The one or more non-transitory computer-readable storage media of claim 14, wherein the second application session is initiated during execution of the first application session, and wherein storage of the first authorization cookie and the second authorization cookie at separate subdomains allows the second authorization cookie to be stored without overwriting the first authorization cookie.

17. The one or more non-transitory computer-readable storage media of claim 14, wherein the first application session and the second application session are executed in a same browser application on a same computing device.

18. The one or more non-transitory computer-readable storage media of claim 13, wherein the first subdomain name is generated by applying a hash function to data including the first session parameters.

19. The one or more non-transitory computer-readable storage media of claim 18, further comprising regenerating the first subdomain name by reapplying the hash function to the data including the first session parameters.

20. The one or more non-transitory computer-readable storage media of claim 19, wherein the regenerating assists in session re-establishment after a disconnection of the first application session or after an interaction with a site external to a service that hosts the first application session.

* * * * *